United States Patent [19]

Fujiwara

[11] Patent Number: 5,392,076
[45] Date of Patent: Feb. 21, 1995

[54] VIDEO SIGNAL PROCESSING DEVICE FOR PRINTING VIDEO DATA WITH HIGHER PICTURE QUALITY IN A DIVISIONAL FRAME PRINTING MODE

[75] Inventor: Masahiro Fujiwara, Tokyo, Japan

[73] Assignee: Sony Corporation, Tokyo, Japan

[21] Appl. No.: 279,905

[22] Filed: Jul. 25, 1994

Related U.S. Application Data

[63] Continuation of Ser. No. 966,700, Oct. 26, 1992, abandoned.

[30] Foreign Application Priority Data

Oct. 31, 1991 [JP] Japan .................................. 3-313511

[51] Int. Cl.[6] .............................................. H04N 5/14
[52] U.S. Cl. .................................. 348/719; 348/715;
358/450; 358/524; 358/527
[58] Field of Search ............... 348/714, 715, 716, 717,
348/718, 719, 571; 355/28; 358/450, 451, 443,
524, 527

[56] References Cited

U.S. PATENT DOCUMENTS

| | | | |
|---|---|---|---|
| 4,148,070 | 4/1979 | Taylor | 358/160 |
| 4,272,787 | 6/1981 | Michael et al. | 358/160 |
| 4,713,693 | 12/1987 | Southworth et al. | 358/160 |
| 4,802,007 | 1/1989 | van der Brug | 358/76 |
| 4,825,296 | 4/1989 | Wagensonner et al. | 358/76 |
| 4,862,269 | 8/1989 | Sonoda et al. | 358/160 |
| 4,935,809 | 6/1990 | Hayashi et al. | 358/76 |
| 4,965,662 | 10/1990 | Shiota | 358/160 |
| 4,991,004 | 2/1991 | Hayashi et al. | 358/76 |
| 5,047,864 | 9/1991 | Fujito | 358/76 |

*Primary Examiner*—James J. Groody
*Assistant Examiner*—John W. Miller
*Attorney, Agent, or Firm*—Limbach & Limbach; Charles P. Sammut

[57] ABSTRACT

When a plurality of frames of picture data are stored in a divided fashion in a memory for storing one frame of picture data, picture data is stored in each assigned storage area of the storage means. When a plurality of frames of picture data are stored in a divided fashion in a memory, picture data sotred in each memory area of the storage is output in the frame mode. Thus, it is possible to effectively avoid the deterioration of the quality of picture data stored in the memory and the output of the picture data of the deteriorated quality that are caused when storing and outputting motion picture data due to reduction of picture data to one half caused by the selection of a field mode with an erroneous operation.

10 Claims, 5 Drawing Sheets

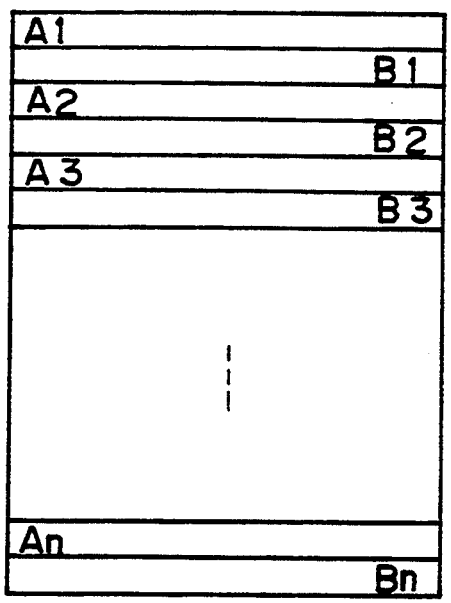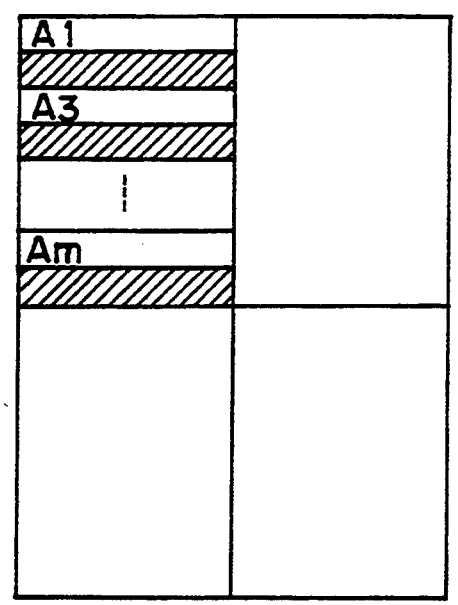
FIG. 2A
(PRIOR ART)
FIG. 2B
(PRIOR ART)

VIDEO SIGNAL PROCESSING DEVICE FOR PRINTING VIDEO DATA WITH HIGHER PICTURE QUALITY IN A DIVISIONAL FRAME PRINTING MODE

This a continuation of application Ser. No. 07/966,700, filed on Oct. 26, 1992, now abandoned.

BACKGROUND OF THE INVENTION

1. Field of the Invention

This invention relates to a video signal processing device, and more particularly to an improvement of a video printer for printing out desired picture data stored in a memory, for example.

2. Description of the Prior Art

In a commonly termed video printer, a video signal VI output from a video tape recorder or the like is converted into digital data, which is stored in a frame memory, the stored picture data being read out for printing on printing paper.

The picture data is stored in the memory either in a frame memory mode or in a field memory mode, these modes being for free selection by the user depending on the subject picture data to be printed.

In the frame memory mode, two fields of picture data are stored as one frame in a storage area of a memory. In the field memory mode, the individual fields of picture data are stored in separate fields of the storage region of the memory.

Picture data stored in the memory is printed on printing paper either in a frame printing mode or in a field printing mode, and these modes are selected discretionally by the user.

In the frame printing mode, the two fields of picture data stored in the memory are directly printed. In the field printing mode, the picture data stored in the memory is divided into two fields, and only one thereof is printed.

Usually, for obtaining a high definition and high quality print of video data, still picture data, picture data stored in the frame memory mode may be printed in the frame printing mode. On the contrary, when motion picture, the field memory mode may be selected on storing picture data, or the field printing mode may be selected on printing picture data.

This is no reason that if motion picture data is written in the frame memory mode (as shown in FIG. 1A), a blur is produced due to the time difference between individual fields A and B of the picture. If the field memory mode is selected for writing data (as shown in FIG. 1B), only field A of the picture (i.e., picture data A1, A2, ..., An) are stored, and thus there is no blur, thus permitting high picture quality to be obtained.

Since the above modes are for free selection by the user, in a division storage mode, in which a plurality of frames are stored in a divided fashion in a memory, a selection like that in case of a full size mode, in which one frame of picture data is stored in the memory, is done, and therefore the picture quality is rather deteriorated.

For example, when motion picture data is stored in a one-fourth division storage mode in the memory, like the case of the full size mode, there is a case of selecting the field memory mode to prevent blurring of the motion picture.

However, in the one-fourth division mode, one field of picture data is contracted and stored in four storage region divisions, that is, a field A obtained by thinning out the scanning lines into one-half in the vertical direction is stored.

If the field memory mode is selected at this time, coarser picture data (A1, A3, ..., Am, m=n−1) of the field A is stored, as shown in FIG. 2B. Since the frame is contracted, the print of picture data is liable to be considerably deteriorated.

Likewise, if the field printing mode is selected by the user on printing, only a single field is printed in the one-fourth division storage region, and therefore the obtainable print of picture data inevitably has deteriorated picture quality.

SUMMARY OF THE INVENTION

In view of the foregoing, an object of this invention is to provide a video signal processor, in which picture data is stored in the frame memory mode and printed in the frame printing mode if a division mode is selected, thus permitting improved convenience of use and high picture quality of print compared to those in the prior art to be obtained.

To solve the above problems, in a first aspect of the invention there is provided a video signal processing device 1, which comprises storage means 4 for storing one frame of picture data, said picture data VI being stored as one frame of picture data when a frame memory mode is selected, the picture data VI being stored as separate fields of picture data in the storage means 4 when a field memory mode is selected, the stored picture data VM in the storage means 4 being read out as one frame picture data when a frame reading mode is selected for reading the picture data VM from the storage means 4, only one field of picture data among the stored picture data VM in the storage means 4 being read out when a field reading mode is selected for the reading of data, the video data processing device 1 further comprising memory control means 7 and system control means 8 for controlling the switching of the modes of storing the picture data VI in the storage means 4, and system control means reading control means 7 and 8 for controlling the switching of the modes of reading the picture data VM from the storage means 4, the memory control means 7 and system control means 8 causing, when storing a plurality of frames of picture data in a divided fashion in the storage means 4, the picture data VI to be stored in each storage area of the storage means assigned for each frame of picture data in a frame memory mode, the reading control means causing, when the plurality of frames of picture data has been stored in a divided fashion in the storage means 4, the picture data VM stored in each storage region of the storage means 4 to be output in a frame output mode.

In a second aspect of the invention, there is provided a video signal processor, which comprises storage means 4 for storing one frame of picture data, the picture data VI being stored as one frame of picture data when a frame memory mode is selected, the picture data VI being stored as separate fields of picture data in the storage means 4 when a field memory mode is selected, the stored picture data VM in the storage means 4 being read out as one frame of picture data when a frame reading mode is selected for reading the picture data VM from the storage means 4, only one field of picture data among the stored picture data VM in the storage means 4 being read out when a field reading mode is selected for the reading of picture data, the video data processing device 1 further comprising memory control means 7 and system control means 8 controlling the switching of the modes of storing the picture data VI in the storage means 4, reading control means 7 and 8 for controlling the switching of the modes of reading the picture data VM from the storing means 4, and picture data printing means 10 and 11 for printing the picture data VM read out from the storage means 4 on printing paper, the storage control means 7 and system control means 8 causing, when storing a plurality of frames of picture data in a divided fashion in the storage means 4, the picture data VI to be stored in each storage region of the storage means assigned for each frame of picture data in a frame memory mode, the reading control means causing, when the plurality of frames of picture data VM has been stored in a divided fashion in the storage means 4, the picture data VM stored in each storage region of the storage means 4 to be output in a frame output mode to the picture data printing means 10 and 11.

When storing a plurality of frames of picture data in a divided fashion in the storage means 4, the picture data VI are stored in each storage region of the storage means assigned for each frame of picture data in a frame memory mode. Thus, it is possible to effectively avoid deterioration of the quality of picture data stored in the storage means 4 when storing motion picture data due to reduction of the picture data to one half caused by the selection of the field mode by an erroneous operation.

In addition, when a plurality of frames of picture data has been stored in a divided fashion in the storage means 4, the picture data VM stored in each storage area of the storage means 4 to be output in a frame output mode. Thus, it is possible to effectively avoid deterioration of the quality of the picture data VM due to the reduction of the output data to one-half caused by the selection of the field mode by an erroneous operation.

The nature, principle and utility of the invention will become more apparent from the following detailed description when read in conjunction with the accompanying drawings in which like parts are designated by like reference numerals or characters.

BRIEF DESCRIPTION OF THE DRAWINGS

Preferred embodiments of this invention will be described with reference to the accompanying drawings:

FIGS. 2A and 2B are schematic diagrams showing picture data stored in the field memory mode in the one-fourth division mode;

DETAILED DESCRIPTION OF THE INVENTION

Figure 3:
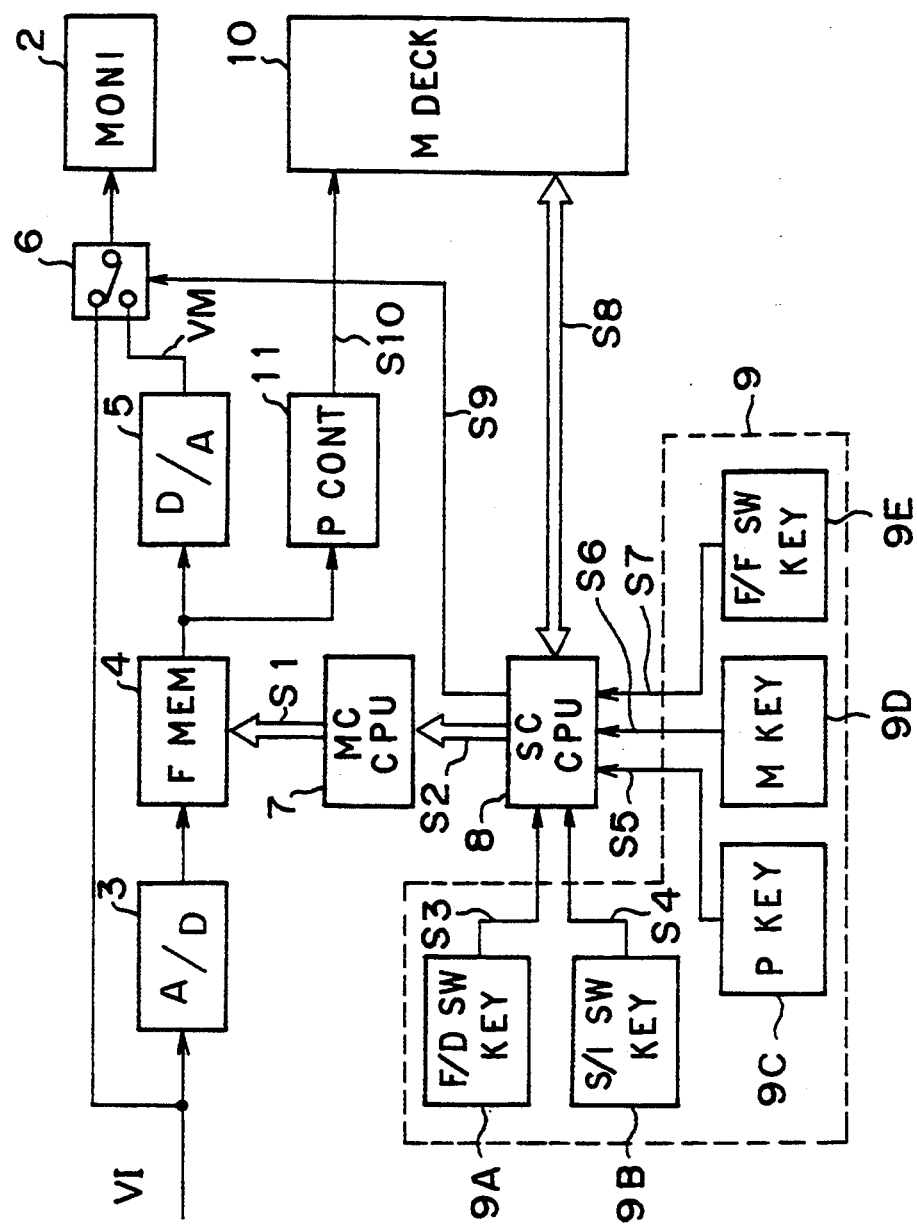
FIG. 3 is a block diagram showing an embodiment of the video signal processing device according to the invention.

Preferred embodiments of this invention will be described with reference to the accompanying drawings:

Referring to FIG. 3, reference numeral 1 generally designates a video printer. An input video signal VI or video signal stored in a frame memory is able to be confirmed in a monitor 2.

More specifically, in the video printer 1 the input video signal VI is converted in an analog-to-digital converter 3 into digital data which is stored in a frame memory 4.

The picture data stored in the frame memory 4 is converted by a digital-to-analog converter 5 into an analog signal, which is output as stored video signal VM through a switching circuit 6 to the monitor 2.

A memory control central processing unit (CPU) 7 is adapted to control the operations of storing and reading data with respect to the frame memory 4 according to a frame memory control signal S1.

The memory control CPU 7 receives a memory control signal S2 from a system control CPU 8 and outputs the frame control signal S1 according to the switching of frame and field modes and also the switching of full size and division memory modes.

The system control CPU 8 is adapted to receive key input signals S3 to S7 from front keys 9A to 9E provided in a front panel unit 9 and serially transmit the memory control signal S2 according to the key input signals S3 to S7.

The input key 9A is a full/division size mode switching key, the input key 9B is a stored/input picture data switching key, the input key 9C is a print key, the input key 9D is a memory key, and the input key 9E is a field/frame switching key.

The system control CPU 8 outputs a mechanical deck unit control signal S8 to a mechanical deck unit 10 to control motors, sensors, etc., so as to control the timings of the feeding of printing paper and printing, and also it outputs a switching control signal S9 to the switching circuit 6 for controlling the switching of video output to the monitor 2.

The mechanical deck unit 10 receives print data S10 from the frame memory 4 through a printing controller 11 and sends out the print data S10 to a head 10A (not shown) for printing out the stored picture data on printing paper.

When a field printing mode is selected, the printing controller 11 effects field interpolation of field picture data received from the frame memory 4 and outputs the field interpolated data.

The system control CPU 8 and memory control CPU 7 control the video printer 1 in the following routine shown in FIG. 4 and 5.

Figure 4:
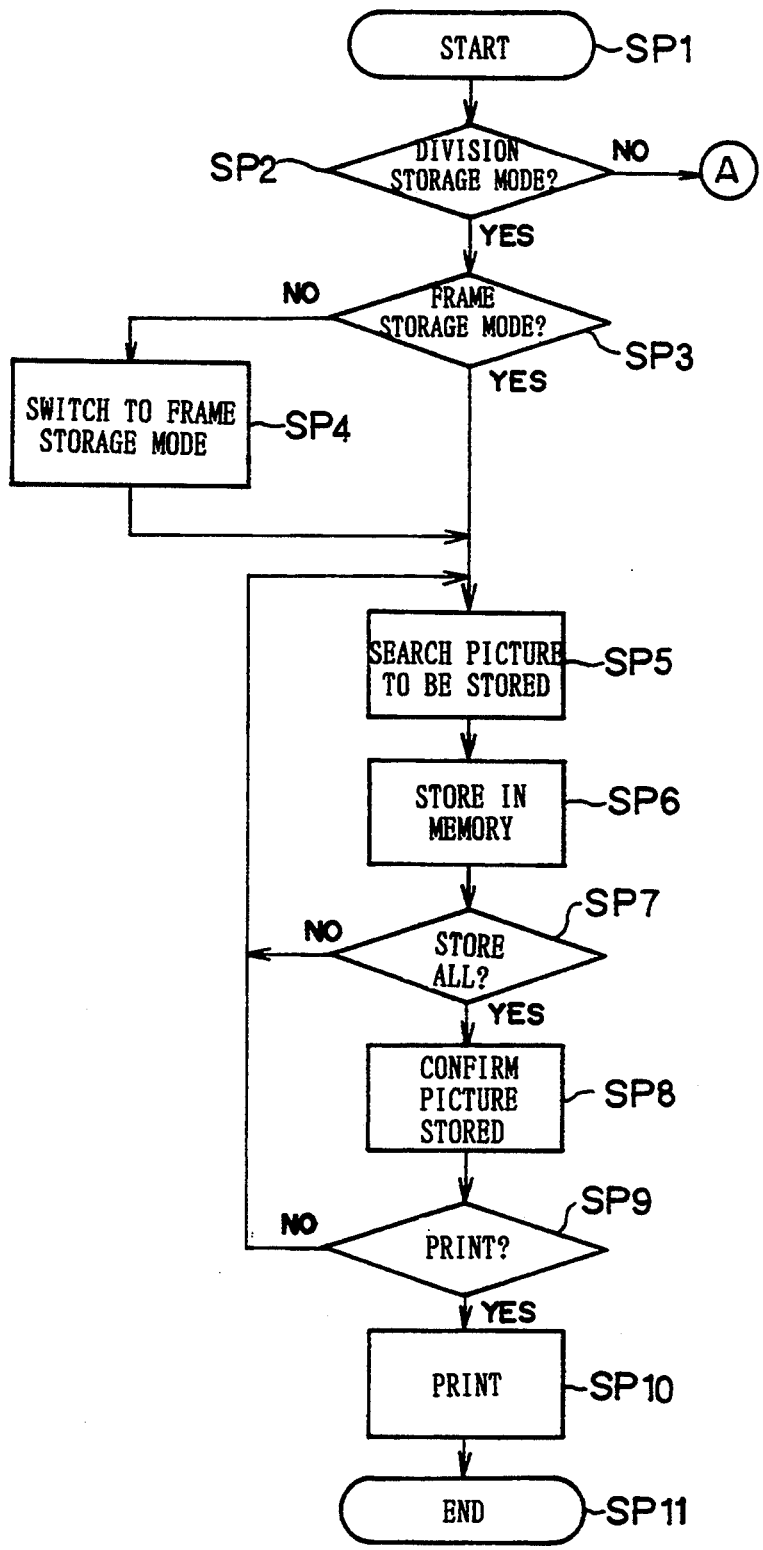
FIG. 4 is a flowchart for explaining the operation of FIG. 3.
Figure 5:
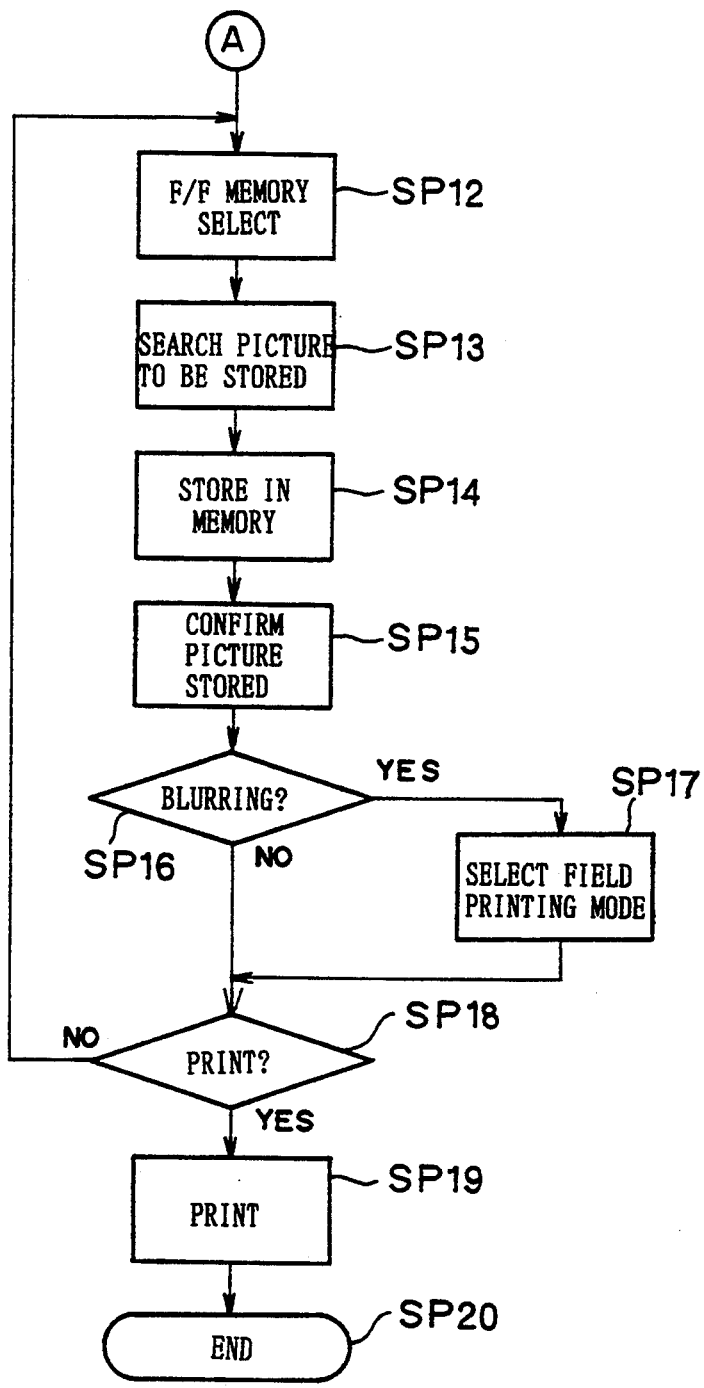
FIG. 5 is a flowchart for explaining the operation of FIG. 3.

When the routine is started in step SP1 in FIG. 4, the CPU 8 executes a next step SP2 of checking whether a division storage mode is selected or not.

If the affirmative result is obtained (which means that the division storage mode is selected), the CPU 8 executes a next step SP3 of checking whether a frame memory mode has been set or not as the prevailing storage mode by a user's key operation.

If a negative result is obtained in the step SP3 (which means that the field memory mode prevails in the division mode), the CPU 8 executes a step SP4 of switching the storage mode over to a frame memory mode, and then executes a step SP5.

Figure 6A:
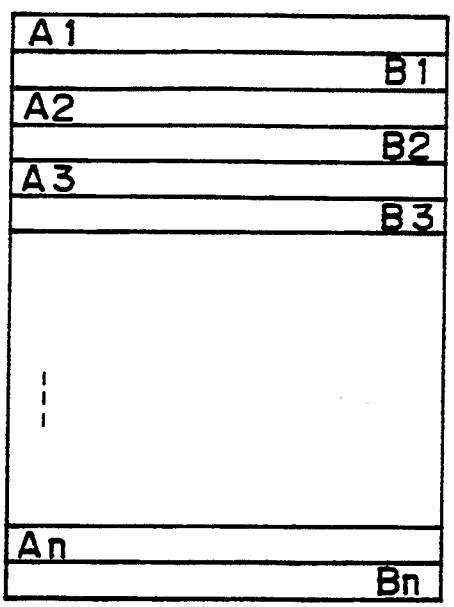
FIGS. 6A and 6B are schematic diagrams showing picture data stored in a frame memory mode in a one-fourth division mode.
Figure 6B:
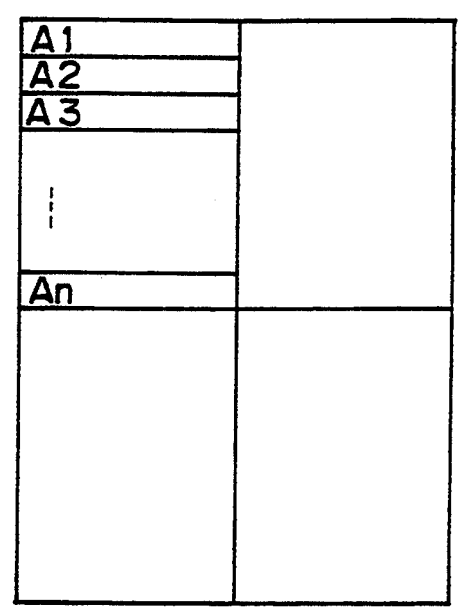

Thus, as shown in FIG. 6B, the CPU 8 can cause storage of one field picture data (A1, A2, . . . , An) without missing in one-fourth area of the memory in the vertical direction. It is thus possible to avoid possible coarsening of the stored picture data, as shown in FIG.

2B, when motion picture data is stored in the division mode due to erroneous selection of the field memory mode.

If the affirmative result is obtained in the step SP3 (which means that the frame memory mode is selected in the division mode), the CPU 8 executes a step SP5 of waiting for the selection of desired picture data to be stored among the input video signal VI by operation of the memory key 9D.

When the selection of the desired picture data to be stored by the user is ended, the CPU 8 executes a step SP6 of causing the selected input picture data to be stored in the frame memory 4 through the memory control CPU 7.

In a subsequent step SP7, the CPU 8 checks whether the selection of all the division memory areas by the user is terminated. If the negative result is obtained (which means that the selection of all the division memory areas has not yet been ended), the CPU 8 returns to the step SP5 and waits for the selection of the remaining picture data.

If the affirmation result is obtained in this way (which means the selection of all the picture data with respect to the division memory regions is ended), the CPU 8 executes a step SP8 of switching the input terminal of the switching circuit 6 to the side of the frame memory 4 to display the prevailing picture data stored in the frame memory 4 on the monitor 2.

Then, the CPU 8 executes a step SP9 of checking whether the printing of picture data stored in the frame memory 4 is selected with the depression of the print key 9C. If the affirmative result is obtained (which means that the picture data stored in the frame memory 4 is not desired by the user), the CPU 8 returns to the step SP5 and waits again for the selection of new picture data.

If the affirmative result is obtained (which means that the video data stored in the frame memory 4 is to be printed), the CPU 8 executes a next step SP10 of feeding printing paper to a predetermined position according to a mechanical deck control signal S8 while causing picture data to be output from the frame memory 4 to the mechanical deck unit 10 under control of the print controller 11, thus effecting the printing of the picture data, and then it goes to a step SP11 to terminate the routine.

If the negative result is obtained in the step SP2 (which means that the full size mode is selected), the CPU 8 executes a next step SP12 (in FIG. 5) of waiting for the selection of the field or frame memory mode by the user depending on whether the picture to be printed is a motion or still picture.

After such selection, the CPU 8 executes a step SP13 of waiting for the selection of picture data to be stored among the input video signal VI by an operation of the memory key 9D.

When the selection of picture data to be stored by the user is ended, the CPU 8 executes a step SP14 of storing the selected picture data VI in the frame memory 4 under control of the memory control CPU 7.

Then, the CPU 8 executes a step SP15 of switching the input terminal of the switching circuit 6 to the side of the frame memory 4 to display the prevailing picture data stored in the frame memory 4 on the monitor 2.

Then, the CPU 8 executes a step SP16 of waiting for the user's judgment as to whether there is blurring of the picture data displayed on the monitor 2. If the affirmative result is obtained (which means that the displayed picture data is blurring), the CPU 8 executes a step SP17.

In this step, the CPU 8 switches the printing mode to the field printing mode, and then executes a step SP18.

If the negative result is obtained (which means that the displayed picture data is free from blurring), the CPU 8 executes the step 18 of checking whether the printing of the data stored in the frame memory 4 is selected or not by the depressing of the print key 9C. If the negative result is obtained (which means that the picture data stored in the frame memory 4 is not desired by the user), the CPU 8 returns to the step SP12 and waits again the selection of new picture data.

If the affirmative result is obtained in step 18 (which means that the picture data stored in the frame memory 4 is to be printed), the CPU 18 executes a next step SP19 of causing printing paper to be fed to a predetermined position according to the mechanical deck signal S8 and also causing the picture data stored in the frame memory 4 to be output to the mechanical deck unit 10 under control of the print controller 11, thus effecting the printing of the picture data stored in the frame memory 4, and then it goes to a step SP20 to terminate the routine.

In the above constitution, in case when it is selected by the user to print out motion picture data displayed on the monitor 2 in the one-fourth division mode, the CPU 8, detecting in the step SP2 that the division mode has been selected or not by the full/division size mode switch key 9A, executes the step SP3 of checking whether the frame mode has been selected by the user with the field/frame switching key 9E. When printing motion picture in the full size, clearer print is obtainable by selecting the field printing mode. Therefore, the user often selects the field printing mode. When the field printing mode is selected, the CPU 8 executes a step SP4 to automatically switch the storage mode over to the frame memory mode to store the input video signal in the frame memory 4 under control of the memory control CPU 7.

Then, the CPU 8 waits for the selection of the first division picture data by the user (step SP5), then it analog-to-digital converts the selected picture data and stores the converted data in the frame memory 4 in the frame memory mode (step SP6), and then it checks whether all the division picture data have been selected or not (step SP7).

The CPU 8 repeatedly executes the above routine (i.e., steps SP5 through SP7) until the user ends the selection of all the four frames with the memory key 9D. When all the selected picture data has been stored in the frame memory 4, the CPU 8 executes a step SP8 of switching the output of the switching circuit 6 to the side of the frame memory 4 for display of the data on the monitor 2.

Then, in response to the user's designation of the printing of the prevailing stored four frames with the depression of the print key 9C (step SP9), the CPU 8 executes a step SP10 of printing the stored picture data on printing paper in the frame printing mode, thus causing the routine to terminate.

Thus, when the division mode is selected, the picture data stored in the frame memory mode is printed out in the frame printing mode irrespective of whether the printed picture data is motion or still picture data. Thus, there is no possibility of deteriorating the picture quality, and high quality print picture can be obtained.

In case when it is selected by the user to print out motion picture data displayed on the monitor 2 in the full size mode, the CPU 8, detecting in the step SP2 that the full size mode has been selected with the full-division size mode switching key 9A, executes a step SP12.

Figure 1A:
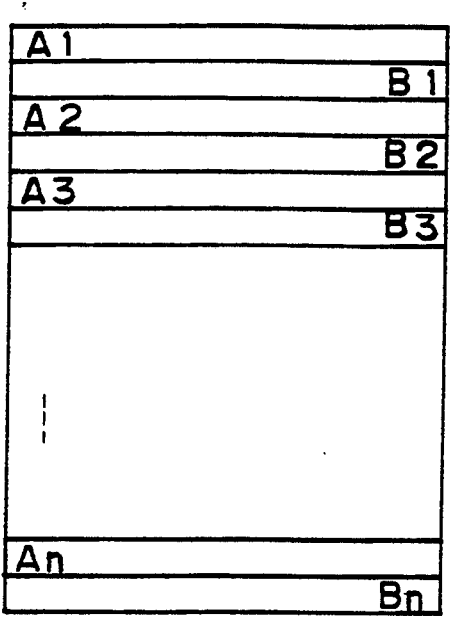
FIGS. 1A and 1B are schematic diagrams showing picture data stored in a field memory mode in a full size mode.
Figure 1B:
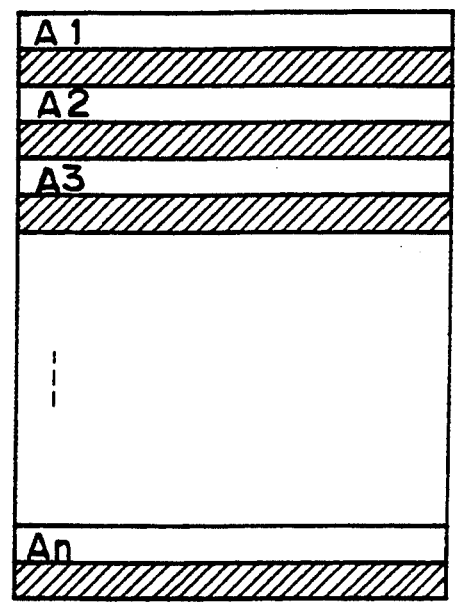

If in this step it is found that the field memory mode has been selected by the user with the field/frame switching key 9E, the CPU 8 waits for the selection of picture data by the user (step SP13), analog-to-digital converts the selected picture data and stores the converted picture data in the frame memory 4 in the field memory mode, as shown in FIG. 1B (step SP14).

Then, the CPU 8 switches the output of the switching circuit 6 to the side of the frame memory 4 for display of data on the monitor 2 to confirm that the picture data to be printed is free from any blur (step SP16).

At this time, the negative result is obtained since it has been detected in the step SP12 that the field memory mode has been selected, and thus the CPU 8 executes a next step SP18. If it has been found in the step SP12 that the frame memory mode has been selected, a blur is sensed, and the affirmative result is obtained. In this case, the CPU 8 executes a step SP17 of switching the printing mode over to the field printing mode for eliminating the blur in the picture data to be printed.

If the printing of picture data stored in the frame memory 4 is designated by the user with the print key 9C (step SP18), the CPU 8 executes a step SP19 of printing out the stored picture data on printing paper, thus causing the routine to terminate.

Thus, if the full size mode has been selected, with motion picture data to be printed the picture data that is stored in the frame memory mode is printed out in the field printing mode or the picture data stored in the field memory mode is printed out in the frame printing mode. Thus, there is no possibility of deteriorating the picture quality, and high picture quality print can be obtained.

With the above constitution, when the one-fourth division mode is selected, the motion picture data is stored in the frame memory mode and printed out in the frame printing mode. Thus, it is possible to effectively avoid, when printing motion picture data in the division mode the storage of the motion picture data in the field memory mode and printing of the data in the field printing mode due to user's erroneous operation. It is thus possible to readily obtain print of high picture quality compared to the prior art.

While the above embodiment has concerned with the printing of motion picture data in the one-fourth division mode, this invention is not limited to this, and is broadly applicable to the printing in various division modes such as one-ninth, one-sixteenth, and so forth.

Further, while the above embodiment has concerned with the input video signal VI input from a video recorder, this invention is not limited to this, and is broadly applicable to the cases of inputs from such video apparatuses as television cameras. Further, the monitor 2 may be replaced with various video apparatuses.

Further, while the above embodiment has concerned with a commonly termed video printer, this invention is not limited to this and is applicable to video apparatuses, in which picture signal is stored in the frame memory 4 in either frame or field mode switched over to each other or is output in either frame or field mode switched over to each other.

Further, while the above embodiment is concerned with storage of one frame of data in the frame memory 4, this invention is not limited to this and is applicable to storage a plurality of frames of picture data in the frame memory.

While the preferred embodiments have has been described in connection with the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A video signal processing device, comprising:
    storage means having divided storage areas for storing one frame of picture data as one frame of picture data when a frame storing mode is selected and as separate fields of picture data when a field storing mode is selected;
    reading means for reading stored picture data from the storage means as one frame of picture data when a frame reading mode is selected, and as only one field of picture data when a field reading mode is selected;
    storage control means for controlling a switching of modes of storing the picture data in the storage means and for causing, when a plurality of frames of picture data are to be stored in the frame storing mode, the plurality of frames of the picture data to be stored in the divided storage areas, with a separate divided storage area assigned to each one of the plurality of frames;
    reading control means for controlling a switching of modes of reading the picture data from the storage means and for causing, when each of the plurality of frames of picture data have been stored in separate divided storage areas assigned to such picture data, the read stored picture data to be output in a frame output mode; and
    picture printing means for printing a picture corresponding to the stored picture data read out from the storage means.

2. The video signal processing device of claim 2, wherein the storage control means further comprises:
    means for changing the mode of storing to the frame storing mode when the mode of reading is a field reading mode and the mode of storing is a field storing mode; and
    means for retaining the mode of storing as the frame storing mode when the mode of reading is the field reading mode and the mode of storing is the frame storing mode.

3. The video signal processing device of claim 2, further comprising:
    means for displaying as one picture a picture corresponding to the picture data stored in the divided storage means after confirmation that picture data is stored in all of the storage areas of the storage means and for controlling the picture printing means to print a picture corresponding to the picture data after display of the one picture by the means for displaying.

4. The video signal processing device of claim 1, further comprising:
    printing control means for interpolating field picture data in response to a user determination of a blur in the displayed picture and an input from the user confirming such determination.

5. The video signal processing device of claim 1, further comprising:
   printing control means for interpolating field picture data in response to a user selection of a field print mode.

6. A method of processing a video signal, comprising the steps of:
   storing within divided storage areas one frame of picture data as one frame of picture data when a frame storing mode is selected and as separate fields of picture data when a field storing mode is selected;
   reading stored picture data from the divided storage areas as one frame of picture data when a frame reading mode is selected, and as only one field of picture data when a field reading mode is selected;
   controlling a switching of modes of storing the picture data in the divided storage areas and for causing, when a plurality of frames of picture data are to be stored in the frame storing mode, the plurality of frames of the picture data to be stored in the divided storage areas, with a separate divided storage area assigned to each one of the plurality of frames;
   controlling a switching of modes of reading the picture data from the storage means and for causing, when each of the plurality of frames of picture data have been stored in separate divided storage areas assigned to such picture data, the read stored picture data to be output in a frame output mode; and
   printing a picture corresponding to the stored picture data read out from the storage means.

7. The method of claim 6, further comprising the steps of:
   changing the mode of storing to the frame storing mode when the mode of reading is a field reading mode and the mode of storing is a field storing mode; and
   retaining the mode of storing as the frame storing mode when the mode of reading is the field reading mode and the mode of storing is the frame storing mode.

8. The method of claim 7, further comprising the steps of:
   displaying as one picture a picture corresponding to the picture data stored in the divided storage means after confirmation that picture data is stored in all of the storage areas of the storage means; and
   wherein the printing of the picture corresponding to the picture data occurs after display of the one picture by the means for displaying.

9. The method of claim 6, further comprising the step of:
   interpolating field picture data in response to a user determination of a blur in the displayed picture and an input from the user confirming such determination.

10. The method of video signal processing device of claim 6, further comprising the step of:
    interpolating field picture data in response to a user selection of a field print mode.

* * * * *

UNITED STATES PATENT AND TRADEMARK OFFICE
CERTIFICATE OF CORRECTION

PATENT NO. : 5,392,076
DATED : February 21, 1995
INVENTOR(S) : Masahiro Fujiwara It is certified that error appears in the above-indentified patent and that said Letters Patent is hereby corrected as shown below:

```
On the title page, line 6 of the Abstract, replace "sotred" with
--stored--.
```

Signed and Sealed this

Second Day of May, 1995

Attest:

BRUCE LEHMAN

Attesting Officer

Commissioner of Patents and Trademarks